United States Patent Office 2,795,536
Patented June 11, 1957

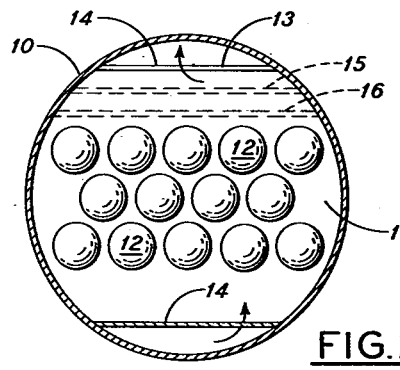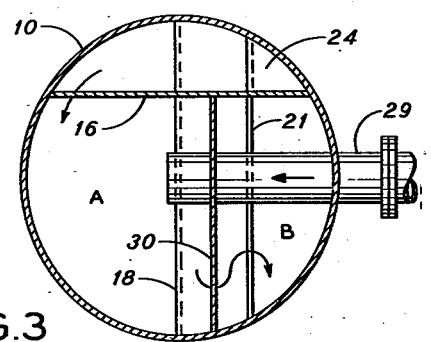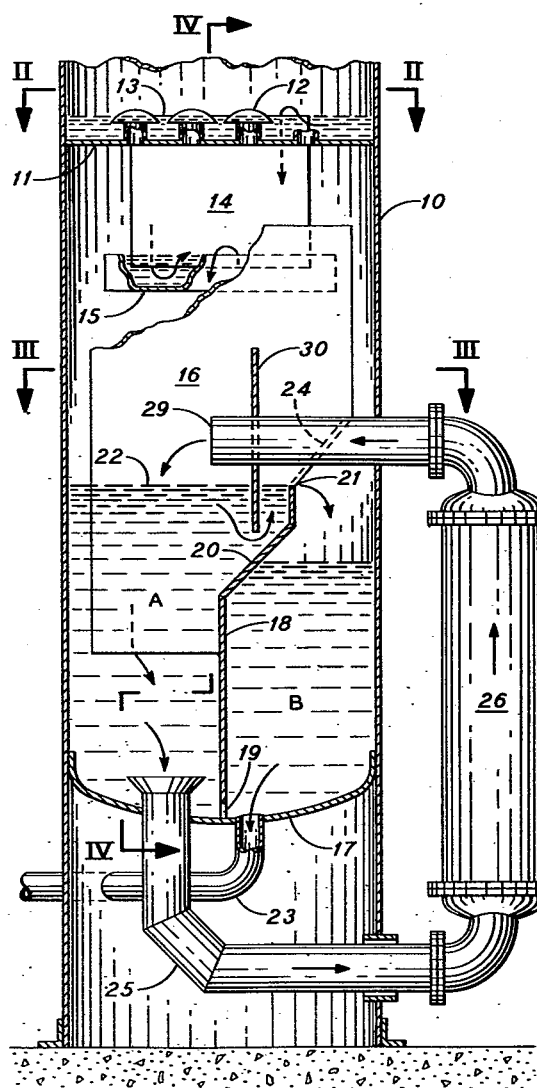
FIG.2   FIG.3
FIG.1   FIG.4
INVENTORS
ARNOLD L. GROSSBERG
ARTHUR W. PRYOR
BY
ATTORNEYS June 11, 1957 A. L. GROSSBERG ET AL 2,795,536
LIQUID CONTROL FOR A FRACTIONATING COLUMN
Filed March 29, 1955 2 Sheets-Sheet 2
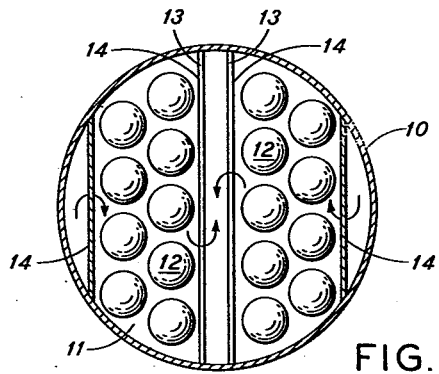
FIG.6
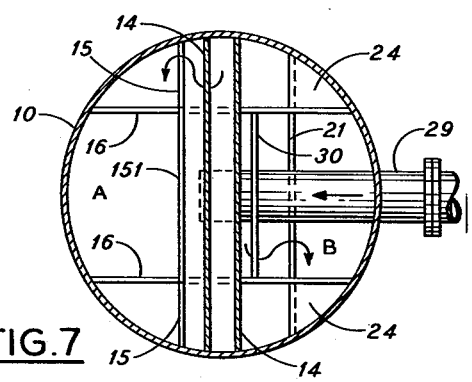
FIG.7
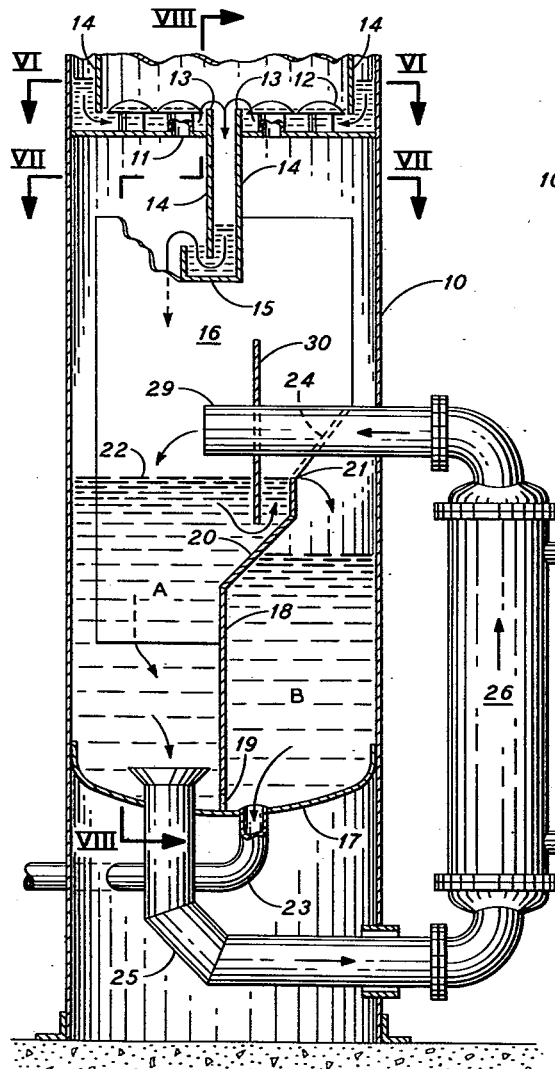
FIG.5
FIG.8
INVENTORS
ARNOLD L. GROSSBERG
ARTHUR W. PRYOR
BY
ATTORNEYS
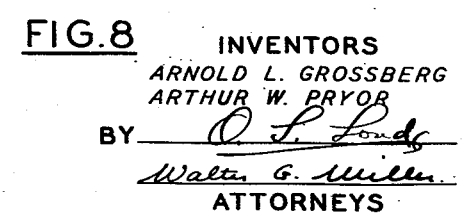

2,795,536
LIQUID CONTROL FOR A FRACTIONATING COLUMN

Arnold L. Grossberg, Berkeley, and Arthur W. Pryor, El Cerrito, Calif., assignors to California Research Corporation, San Francisco, Calif., a corporation of Delaware Application March 29, 1955, Serial No. 497,594

9 Claims. (Cl. 202—39)

This invention relates to methods and apparatus for fractional distillation of liquid mixtures, and is particularly concerned with the control of liquid passing from a fractionating zone into a lower separating zone from which it is selectively withdrawn into a reboiler and the heated fluids returned to the separating zone. Desirably, but not necessarily, the reboiler is of the thermosyphon type and the flow therethrough is of the indefinite, or multi-pass circulation type, wherein any given unit quantity of liquid may pass repeatedly through the heater before leaving the separation zone and the system.

It is an object of this invention to provide methods and means for withdrawing liquids from the lowest plate of a fractionating zone and conveying them directly into the circulating stream of liquid passing into a reboiler, without contact with the heated fluids returning to a separating zone from said reboiler.

Another object is to provide methods and means for returning heated fluids from a reboiler to a pool of liquid in a separating zone above the level of said liquid to avoid agitation thereof and entrainment of liquid in vapors rising from said pool to re-enter the fractionating zone.

Another object is to provide methods and means for withdrawing liquid from beneath the surface of a first pool of liquid in a separating zone below a fractionating zone and to convey it out of the separating zone without substantial contact with liquid entering said zone from said fractionating zone, or with fluids returning from a reboiler associated with said separating zone.

Another object is to provide a simple and economical arrangement of baffles and weirs for carrying out the methods disclosed herein.

These and other objects and advantages will be further apparent from the following description of the improved methods and preferred embodiments of exemplary apparatus for practicing them, as illustrated in the attached drawings, which form a part of this specification.

In the drawing, Figure 1 is a vertical sectional view of the lower part of a fractionating column provided with a separating zone and connected to a reboiler for adding heat to liquids passing into said separating zone.

Figure 2 is a horizontal sectional view on line II—II through the fractionating zone of Figure 1.

Figure 3 is a horizontal sectional view on line III—III through the separating zone of Figure 1.

Figure 4 is a vertical sectional view on line IV—IV of the lower part of the fractionating zone and a part of the separating zone of Figure 1, and taken in a plane at right angles to that figure.

Figure 5 is a vertical sectional view of an alternative arrangement of liquid flow means in a fractionating zone and a separating zone embodying this invention.

Figure 6 is a horizontal sectional view on line VI—VI of the fractionating zone arrangement of Figure 5.

Figure 7 is a horizontal sectional view on line VII—VII of the separating zone of Figure 5.

Figure 8 is a vertical sectional view on line VIII—VIII of the lower part of the fractionating zone and a part of the separating zone of Figure 5, and taken in a plane at right angles to that figure.

Referring to Figures 1 and 2, reference number 10 designates the vertical cylindrical shell of a fractionating column for separating liquid mixtures, such as mineral oils, into fractions having desired properties, such as boiling ranges. The upper portion of the shell (not shown) is provided with the usual feed and outlet connections which are not pertinent to this description. The major portion of the shell contains vapor-liquid contacting means exemplified by the transverse bubble plate 11 fitted with the usual bubble caps 12 to permit upward vapor flow, and a single liquid level-controlling weir 13 and downspout plate 14 to provide adequate submergence for bubble caps 12 and to permit downward liquid flow from plate 11, all constituting what may be termed a fractionating zone. In the example of these figures, liquid flows entirely across each plate 11 before descending to the next lower one, and the arrangement is accordingly termed full cross-flow. The space between downspout plate 14 of the lowest bubble plate 11 and the inside of shell 10 is sealed at its lower end by a cup member 15, secured to shell 10 as by welding and is adapted to retain a body of liquid to seal the lower end of the downspout against undesired flow of vapor in either direction.

A vertical baffle plate 16, secured along its edges to shell 10 as by welding, is positioned inwardly from the overflow edge of cup 15 and extends from a point somewhat above the top of cup 15 downwardly along shell 10 to a point near the bottom head 17, as illustrated in Figures 1 and 2. This provides a relatively confined passage for liquid flowing downwardly from the bottom of the fractionating zone, below bubble plate 11, for a purpose which will be explained in further detail below.

A separation plate 18, which divides the separation zone in shell 10 below bubble plate 11 into two pools, extends upwardly from bottom head 17 and is sealed to the head and to shell 10 as by welding. If desired, a small drain opening 19 may be provided at the bottom of plate 18 to facilitate cleaning. Desirably, but not necessarily, plate 18 is somewhat offset laterally as at 20, and its upper edge provides an overflow weir 21, so that liquid 22 accumulating in the left-hand or A pool may flow into the right-hand or B pool and be withdrawn from the system through outlet connection 23 in head 17. A small segmental seal plate 24 serves to seal off the passage formed behind baffle plate 16 to prevent liquid from cup 15 from flowing into pool B outside of weir 21.

Liquid 22 accumulating in pool A is withdrawn from the bottom of the pool through inlet conduit 25 to a reboiler 26, which may be of the conventional tubular type heated by steam entering connection 27 from a suitable source (not shown) while condensate is removed from connection 28. Heated fluids from reboiler 26 pass through outlet conduit 29 extending inwardly through shell 10 to a point above pool A, at a level somewhat above the level of weir 21 on separation plate 18. Desirably, but not necessarily, a vertical stilling baffle plate 30 surrounds reboiler outlet conduit 29 and extends transversely across shell 10 to intersect the vertical baffle plate 16 (Figure 3) with its lower edge somewhat below the level of overflow weir 21 between pools A and B. The stilling plate 30 keeps turbulent fluids from the reboiler out of direct contact with liquid 22 passing from pool A to pool B, and also insures that at least some separation of vapors will take place from the surface of pool A at the left side of plate 30 before the overflow liquid 22 passes under the lower edge of that plate over weir 21 and into pool B, from which it is withdrawn by suitable level-control or other flow-control means (not shown).

Referring back to baffle plate 16, it will be noted that it functions to direct overflow liquid from the fractionating zone above plate 11 through downspout 14 and cup 15 to be substantially out of contact with turbulent fluids from reboiler outlet conduit 29, as well as out of contact with the upper portion of liquid 22 in pool A, and directs that overflow liquid downwardly to the lower portion of pool A where it passes into reboiler inlet conduit 25. This insures that all of the liquid leaving the fractionating zone passes at least once through the reboiler 26, the advantages of which have been proved by several commercial installations, and which will be apparent to one skilled in this art.

Also, the vertical spacing of reboiler outlet conduit 29 above the level of liquid in pool A, as defined by weir 21, reduces impingement and turbulence of the liquid in that pool and thereby decreases the entrainment of liquid in vapor rising from that pool to pass through bubble plate 11 into the fractionating zone.

The alternative embodiment of Figures 5 to 8, inclusive, to which the same reference numerals have been applied, illustrates a half cross-flow arrangement for liquid in the fractionating zone above bubble plate 11, which necessitates somewhat different liquid-directing means for the separation zone. For example, referring to Figure 5, it will be noted that the liquid from plate 11 flows downwardly between two centrally located downspout plates 14 and overflows from seal cup 15 only at the ends thereof behind the opposed vertical baffle plates 16 (Figure 8). This requires that the central portion 151 of the seal cup 15 should extend upwardly above the end weir portions to prevent undesired liquid flow directly into the pool A. Also, the stilling plate 30 extends only between the opposed vertical baffle plates 16.

From the foregoing, it is apparent that numerous changes could be made in the mode of operation, as well as the construction of the apparatus suitable for practicing the improved methods without departing from the essence of the invention disclosed herein. Accordingly, all such modifications that come within the scope of the appended claims are intended to be embraced thereby.

We claim:

1. For use with a fractionating column having a separating zone below a fractionating zone and a thermosyphon reboiler communicating with said separating zone, means for withdrawing only selected liquid components from said separating zone comprising, in combination, a baffle providing an overflow weir and separating said last-named zone into a first pool and a second pool, means for directing liquid flowing from said fractionating zone into said first pool, a liquid inlet connection for said thermosyphon reboiler adjacent to the bottom of said first pool, a return fluid connection from said thermosyphon reboiler to said first pool and spaced above said weir, and a liquid outlet for said second pool.

2. A combination according to claim 1 in which said means for directing liquid into said first pool terminates below the level of said weir.

3. A combination according to claim 1, in which said means for directing liquid from said fractionating zone separates said liquid from fluids entering the first pool of said separating zone from said thermosyphon reboiler return fluid connection.

4. A combination according to claim 1, in which said means for directing liquid from said fractionating zone into said first pool is provided with a liquid seal independent of the liquid in said separating zone to prevent passage therethrough of vapors from said separating zone.

5. A combination according to claim 1, in which said means for directing liquid from said fractionating zone into said first pool is provided with an independent liquid seal above the level of liquid in said first pool to prevent passage therethrough of vapors from said separating zone.

6. A combination according to claim 1, with the addition of a second substantially vertical baffle parallel to said overflow weir and extending downwardly into said first pool to a level below the level of said weir, to separate liquid flowing thereover from fluids entering said first pool from said thermosyphon reboiler.

7. In a process for fractionally distilling liquids in a fractionating column having a fractionating zone, a liquid bottoms-accumulating zone, a liquid-vapor separating zone between said fractionating zone and said accumulating zone, and a reboiling zone, the steps which comprise passing all of the liquid from the bottom of said fractionating zone into a first bottoms-accumulating pool, withdrawing accumulated liquid adjacent the bottom thereof, passing it through a reboiling zone to effect partial vaporization thereof, discharging all of the heated fluids from the reboiling zone into that part of the liquid-vapor separating zone immediately above the level of liquid in said pool and out of contact with said liquid from said fractionating zone, passing separated vapors to the bottom of said fractionating zone, maintaining said pool at a constant liquid level by flowing liquid therefrom into a contiguous second bottoms-product accumulating pool maintained in open communication with said liquid-vapor separating zone, and withdrawing a liquid bottoms-product from the second pool.

8. In a process for fractionally distilling liquids in a fractionating column having a fractionating zone, a liquid bottoms-accumulating zone, a liquid-vapor separating zone between said fractionating zone and said accumulating zone, and a reboiling zone, the steps which comprise passing all of the liquid from the bottom of said fractionating zone into a first bottoms-accumulating pool, withdrawing accumulated liquid adjacent the bottom thereof, passing it through a reboiling zone to effect partial vaporization thereof, discharging all of the heated fluids from the reboiling zone into that part of the liquid-vapor separating zone immediately above the level of liquid in said pool and out of contact with said liquid from said fractionating zone, passing separated vapors to the bottom of said fractionating zone, maintaining said pool at a constant liquid level by flowing liquid therefrom into a contiguous second bottoms-product accumulating pool maintained in open communication with said liquid-vapor separating zone, and withdrawing a liquid bottoms-product from the second pool at a rate such as to maintain the liquid level in the second pool lower than that in the first pool.

9. In a process for fractionally distilling liquids in a fractionating column having a fractionating zone, a liquid bottoms-accumulating zone, a liquid-vapor separating zone between said fractionating zone and said accumulating zone, and a reboiling zone, the steps which comprise passing all of the liquid from the bottom of said fractionating zone into and below the surface of the liquid in a first bottoms-accumulating pool, withdrawing accumulated liquid adjacent the bottom thereof, passing it through a reboiling zone to effect partial vaporization thereof, discharging all of the heated fluids from the reboiling zone into that part of the liquid-vapor separating zone immediately above the level of liquid in said pool and out of contact with said liquid from said fractionating zone, passing separated vapors to the bottom of said fractionating zone, maintaining said pool at a constant liquid level by flowing liquid therefrom into a contiguous second bottoms-product accumulating pool maintained in open communication with said liquid-vapor separating zone, the level of liquid transfer from the first pool to the second pool lying above the level at which the liquid from the fractionating zone is introduced into the first pool, and withdrawing a liquid bottoms-product from the second pool.

References Cited in the file of this patent

UNITED STATES PATENTS

| 896,434 | Chute | Aug. 18, 1908 |
| 2,352,160 | Brown | June 27, 1944 |
| 2,378,728 | Roach | June 19, 1945 |
| 2,534,173 | Kraft | Dec. 12, 1950 |
| 2,581,881 | Pyle | Jan. 8, 1952 |